United States Patent
Nakajima

(10) Patent No.: US 7,891,801 B2
(45) Date of Patent: Feb. 22, 2011

(54) ULTRAVIOLET RAY CURABLE INK-JET INK, INK-JET RECORDING METHOD AND INK-JET RECORDING APPARATUS

(75) Inventor: Atsushi Nakajima, Hachioji (JP)

(73) Assignee: Konica Minolta Medical & Graphic, Inc., Tokyo (JP)

(*) Notice: Subject to any disclaimer, the term of this patent is extended or adjusted under 35 U.S.C. 154(b) by 629 days.

(21) Appl. No.: 11/920,655

(22) PCT Filed: May 24, 2006

(86) PCT No.: PCT/JP2006/310299

§ 371 (c)(1),
(2), (4) Date: Nov. 19, 2007

(87) PCT Pub. No.: WO2006/129530

PCT Pub. Date: Dec. 7, 2006

(65) Prior Publication Data

US 2009/0135238 A1    May 28, 2009

(30) Foreign Application Priority Data

May 30, 2005    (JP) .............................. 2005-157002

(51) Int. Cl.
   B41J 2/01    (2006.01)
(52) U.S. Cl. ..................................... 347/102
(58) Field of Classification Search ............... None
   See application file for complete search history.

(56) References Cited

U.S. PATENT DOCUMENTS 6,550,905 B1    4/2003    Deckers

| | | | |
|---|---|---|---|
| 2001/0041755 A1* | 11/2001 | Ito et al. | 523/161 |
| 2002/0015002 A1* | 2/2002 | Yasukawa et al. | 343/895 |
| 2004/0021753 A1 | 2/2004 | Yoshihiro et al. | |
| 2004/0024078 A1* | 2/2004 | Itoh et al. | 522/1 |
| 2004/0099170 A1 | 5/2004 | Takabayashi | |
| 2004/0110862 A1 | 6/2004 | Hayashi | |

FOREIGN PATENT DOCUMENTS

| | | |
|---|---|---|
| EP | 0 540 203 A1 | 5/1993 |
| EP | 1 142 966 A1 | 10/2001 |
| EP | 1 426 421 A1 | 6/2004 |
| JP | 2003-292855 A | 10/2003 |
| JP | 2004-224841 A | 8/2004 |
| JP | 2005-154537 A | 6/2005 |
| WO | WO 2004/005412 A2 | 1/2004 |

OTHER PUBLICATIONS

Ciba Specialty Chemicals, Ciba IRGACURE 369, Apr. 9, 2001, Ciba Specialty Chemicals, Inc., Coating Effects Segment, p. 1.*

* cited by examiner

*Primary Examiner*—Stephen D Meier
*Assistant Examiner*—Alexander C Witkowski
(74) *Attorney, Agent, or Firm*—Holtz, Holtz, Goodman & Chick, P.C.

(57) ABSTRACT

An ultraviolet ray curable ink-jet ink comprising at least a mono-functional monomer, a bi-functional monomer, and a photo-polymerization initiator,
   wherein an amount of the mono-functional monomer is at least 35 weight % based on the total weight of the ink-jet ink, and
   an amount of the photo-polymerization initiator is at least 20 weight % based on the total weight of the mono-functional monomer.

10 Claims, 1 Drawing Sheet

ULTRAVIOLET RAY CURABLE INK-JET INK, INK-JET RECORDING METHOD AND INK-JET RECORDING APPARATUS

This application is the United States national phase application of International Application PCT/JP2006/310299 filed May 24, 2006.

FIELD OF THE INVENTION

This invention relates to an ultraviolet ray curable ink-jet ink which enables recording of an image exhibiting high flexibility after curing of the ink droplets, and high image durability to such as bending, and relates to an ink-jet recording method, and an ink-jet recording apparatus using the above ink-jet ink.

BACKGROUND OF THE INVENTION

In recent years, ink-jet recording systems, which enable simple formation of images at low cost, have been used in various printing applications such as photography, various types of printing, and special printing such as marking and color filters. Specifically, by employing ink-jet recording apparatuses, which eject controlled minute dots of ink, ink-jet inks which have been improved in color reproduction, durability, and ejection adaptability, and specialized paper media which have been enhanced in color forming properties of colorants and surface glossiness, it has become possible to achieve image quality comparable to conventional silver halide photography. Image quality of the present ink-jet recording systems is enhanced only when an ink-jet recording apparatus, an ink-jet ink and a specialized paper medium are simultaneously improved.

Specifically the ultraviolet ray curable ink-jet system which cures the ink by cross-linkage of ultraviolet (UV) rays after image recording, requires no specific image receiving layer and it is possible to record onto various types of base materials (namely recording media), resulting in drawing attention in the market, and has also resulted in the study of wider application, (please refer, for example, to Patent Document 1). However, even if this system can record an image onto various base materials, there have been drawbacks such as insufficient adhesion to the base materials and insufficient physical properties of the ink layer.

In an ultraviolet ray (UV) curing method, since the reaction proceeds instantaneously under light irradiation whereby monomers are three-dimensionally cross-linked, shrinkage of the ink in curing and deterioration of ink layer flexibility results. As a result, easily caused tend to be problems such as decreased flexibility, resulting in cracks in the image area when the base material is sharply bent or cut. Further, in the UV curing method, mass decrease of the ink does not occur on the base material, and the ink layer remains in a thick state, resulting in undesirable decreased flexibility.

To overcome these problems, it has been considered to add a liquid exhibiting no reactivity such as a plasticizer or a solvent of relatively high boiling point in order to provide ink layer flexibility, however these materials are not preferable from the view point of being VOC-free (namely a volatile organic compound), and insufficient curing sensitivity.

At present, one of the most effective countermeasures is to decrease three-dimensional crosslink density, that is, to increase the ratio of mono-functional monomer having lower cross-linking points. A mono-functional monomer generally exhibits low viscosity, which low viscosity is preferable to obtain ejection suitability of the ink-jet ink. In addition, the low viscosity is effective in preventing wrinkling which is peculiar to UV curing. (Please refer, for example, to Patent Document 2.)

However, when the ratio of a mono-functional monomer in the ink is increased, curing reactivity is decreased and deterioration of curing sensitivity is generated. This results from the fewer reaction points, but in addition to that, there is the issue which makes the ink susceptible to reduced curing reaction inhibition in an oxygen ambience. Specifically in an ink-jet recording method employing small ink droplets to obtain a higher resolution image, the effect of decreased sensitivity due to oxygen inhibition is marked.

Improvement of the effect of curing reaction inhibition by oxygen is proposed to conduct the reaction under a nitrogen atmosphere. (Please refer, for example, to Patent Document 3.) Also proposed has been an attempt to decrease the volume of photo-polymerization initiator. However, in that method, the apparatus becomes more complex, resulting in major factor of higher cost. For example, in the case of a large serial printer, enclosing of the equipment in a nitrogen atmosphere is accomplished only with much difficulty.

Patent Document 1: European Patent 540,203 B2
Patent Document 2: Unexamined Japanese Patent Application Publication No. (hereinafter, referred to as JP-A) 2004-175906
Patent Document 3: U.S. Pat. No. 6,550,905 B1

SUMMARY OF THE INVENTION

Disclosure of the Invention

An object of the present invention is to provide an ultraviolet curable ink-jet ink which is superior in photo-curable sensitivity, adhesion to a base material, flexibility in image portions, and layer strength, without reducing the otherwise excellent characteristics exhibited by an ink-jet recording method, such as high image quality, and exhibiting no odor in the ink or the formed image; and also to provide an ink-jet recording method and an ink-jet recording apparatus using the ink-jet ink.

Means To Solve the Problems

The above objects of this invention are achieved via the following embodiments.

Item 1. An ultraviolet ray curable ink-jet ink comprising at least a mono-functional monomer, a bi-functional monomer, and a photo-polymerization initiator, wherein an amount of the mono-functional monomer is at least 35 weight % based on the total weight of the ink-jet ink, and an amount of the photo-polymerization initiator is at least 20 weight % based on the total weight of the mono-functional monomer.

Item 2. The ultraviolet ray curable ink-jet ink described in Item 1 above, wherein the ink-jet ink substantially contains no solvent.

Item 3. The ultraviolet ray curable ink-jet ink described in Item 1 or 2 above, wherein a molecular weight of the photo-polymerization initiator is at least 250.

Item 4. The ultraviolet ray curable ink-jet ink described in any one of Items 1-3 above, further comprising a propylene oxide modified acrylate or an ethylene oxide modified acrylate.

Item 5. An ink-jet recording method using the ultraviolet ray curable ink-jet ink described in any one of Items 1-4 above.

Item 6. The ink-jet recording method described in Item 5 above, wherein image printing is conducted with a serial recording method.

Item 7. The ink-jet recording method described in Item 5 or 6 above, wherein an ultraviolet ray light-source of at least 7.60 W/cm is employed.

Item 8. An ink-jet recording apparatus employing an ink-jet recording method described in any one of Items 5-7 above.

EFFECT OF THE INVENTION

According to this invention, it is possible to provide an ultraviolet ray curable ink-jet ink which is superior in photo-curable sensitivity, adhesion to its base material, flexibility in image portions, and layer strength, as well as exhibiting no odor in the ink nor the formed image; and also to provide an ink-jet recording method and an ink-jet recording apparatus using the ink-jet ink.

BRIEF DESCRIPTION OF THE DRAWINGS

Embodiments will now be described, by way of example only, with reference to the accompanying drawings which are meant to be exemplary, not limiting, and wherein like elements are numbered alike in the several figures, in which.

NAME OF THE ALPHA-NUMERICAL DESIGNATIONS

Figure 1:
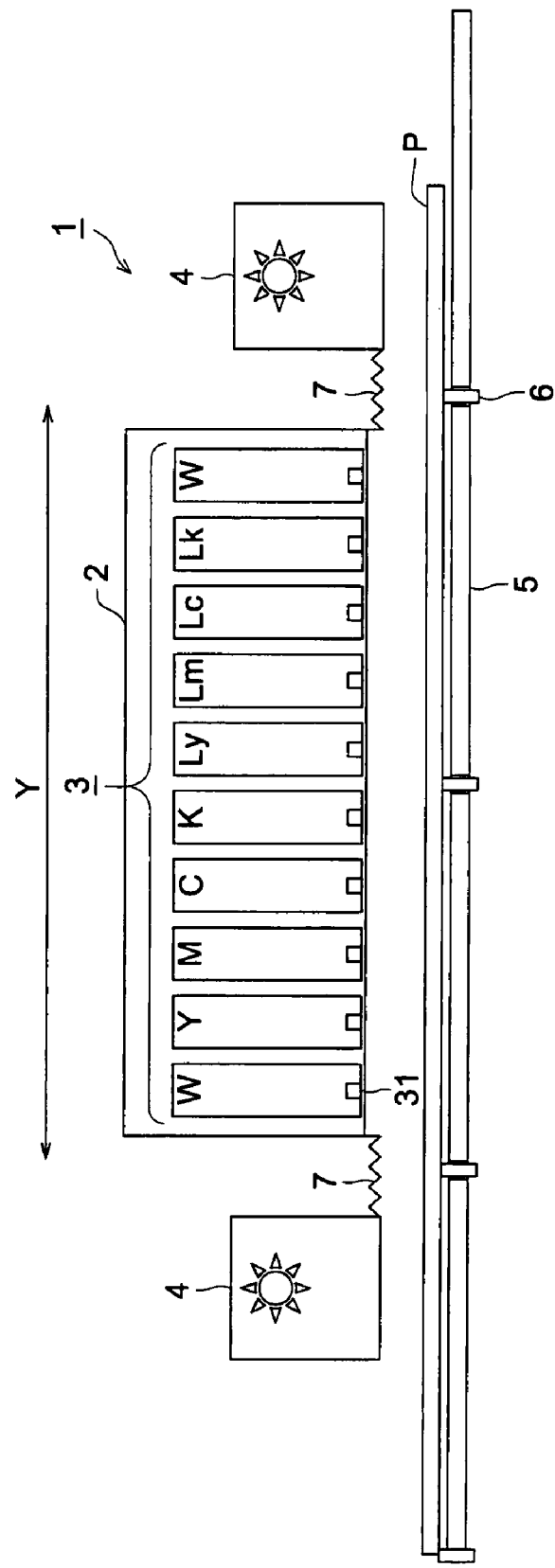
FIG. 1 is a schematic framework showing an example of an ink-jet recording apparatus.

1: Recording apparatus
2: Head carriage
3: Recording head
4: Irradiation means of ultraviolet rays
5: Platen portion
6: Guide members
31: Ink ejection portion
P: Recording medium

PREFERABLE EMBODIMENTS OF THIS INVENTION

It should be understood that no single element of any of the embodiments described herein is essential, and that it is within the contemplation of the invention that one or more elements (or method steps) of one or more embodiments of the invention as described herein may be omitted or their functionality may be combined with that of other elements as a general matter of design choice.

In the ultraviolet ray curable ink-jet ink of the present invention, an ultraviolet curable ink-jet ink which is superior in photo-curable sensitivity, adhesion to a base material, flexibility in image portions and layer strength, and exhibiting no odor in the ink and a formed image; and also to provide an ink-jet recording method and an ink-jet recording apparatus using the aforesaid ink-jet ink.

The reason why an object of this invention can be achieved by constitutions of this invention is considered as follows. Firstly, it is necessary to incorporate a mono-functional monomer in an amount of not less than 35 weight % based on the total weight of an ink-jet ink, with respect to maintaining suitable adhesion to a base material, flexibility in image portions and layer strength. The upper limit of the aforesaid mono-functional monomer is preferably not more than 70 weight % base on the total weight of the ink, with respect to prevention of such as decrease of reactivity, sensitivity decrease, increase of a residual monomer, and increase of odor of the ink and an image.

Heretofore, an ink constitution having a large amount of a mono-functional monomer, such as an application of this invention, causes an insufficient result with respect to curing sensitivity against ultraviolet rays, and has been considered to be problematic in practical use. In this invention, an amount of a mono-functional monomer is increased; however, an amount of a photo-polymerization initiator is also increased corresponding thereto, whereby influence of oxygen inhibition is depressed to achieve an ink composition exhibiting suitable flexibility and layer strength of a formed ink image, and curing sensitivity being sufficient for practical use.

In the following, this invention will be detailed.

<Ultraviolet Curable Non-Solvent Ink-Jet Ink>

First, an ultraviolet ray curable ink-jet ink (hereinafter, also referred to as an ink) of this invention will be explained.

An ink of this invention contains at least a polymerizing monomer such as a mono-functional monomer and a bi-functional monomer, and a photo-polymerization initiator.

[Polymerizing Monomer]

As a mono-functional monomer according to this invention, various types of (meth)acrylate monomers can be utilized; for example, listed are mono-functional monomers such as isoamyl acrylate, stearyl acrylate, lauryl acrylate, octyl acrylate, decyl acrylate, isomyristyl acrylate, isostearyl acrylate, 2-ethylhexyl diglycol acrylate, 2-hydroxybutyl acrylate, 2-acryloyloxyethyl hexahydropleththalate, butoxyethyl acrylate, ethoxydiethylene glycol acrylate, methoxydiethylene glycol acrylate, methoxypolyethylene glycol acrylate, methoxypropylene glycol acrylate, phenoxethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, 2-acryloyloxyethyl succinate, 2-acryloyloxyethyl phthalate, 2-acryloyloxyethyl-2-hydroxyethyl phthalate, lactone modified flexible acrylate and t-butylcycohexyl acrylate.

(Bi-Functional Monomer)

A bi-functional monomer according to this invention includes bi-functional monomers such as triethylene glycol diacrylate, tetraethylene glycol diacrylate, polyethylene glycol diacrylate, tripropylene glycol diacrylate, polypropylene glycol diacrylate, 1,4-butanediol diacrylate, 1,6-hexanediol diacrylate, 1,9-nonanediol diacrylate, neopentylglycol diacrylate, dimethyloltricyclodecane diacrylate, EO (ethyleneoxide) adduct diacrylate of bisphenol A, PO (propyleneoxide) adduct acrylate of bisphenol A, hydroxypivalic acid neopentylglycol diacrylate and polytetramethylene glycol diacrylate.

In an ink-jet ink of this invention, the above-described mono-functional monomer and bi-functional monomer are indispensable constituent components; however, in addition to them, a poly-functional monomer of not less than tri-functional can be also utilized.

A poly-functional monomer utilized in this invention includes poly-functional monomers of not less than tri-functional such as trimethylolpropane triacrylate, EO modified trimethylolpropane triacrylate, pentaerythritol triacrylate, pentaerythritol tetraacrylate, dipentaerythritol hexaacrylate, ditrimethylolpropane tetraacrylate, glycerinpropoxy triacrylate, caprolactone modified trimethylolpropane triacrylate, pentaerythritolethoxy tetraacrylate and caprolactam modified dipentaerythritol hexaacrylate.

In addition to these, polymerizing oligomers can be also blended similarly to the monomers. Polymerizing oligomers include such as epoxy acrylate, aliphatic urethane acrylate, aromatic urethane acrylate, polyester acrylate and straight chain acryl oligomer.

Herein, among the above described monomers, specifically preferable are isoamyl acrylate, stearyl acrylate, lauryl acrylate, octyl acrylate, decyl acrylate, isomyristyl acrylate, isostearyl acrylate, ethoxydiethylene glycol acrylate, methoxypolyethylene glycol acrylate, methoxypropylene glycol acrylate, isobornyl acrylate, lactone modified flexible acrylate, tetraethylene glycol diacrylate, polyethylene glycol diacrylate, polypropylene glycol diacrylate, EO modified trimethylolpropane triacrylate, dipentaerythritol hexaacrylate, ditrimethylolpropane tetraacrylate, glycerinpropoxy triacrylate, caprolactone modified trimethylolpropane triacrylate, pentaerythritolethoxy tetraacrylate and caprolactam modified dipentaerythritol hexaacrylate, with respect to such as sensitizing, skin irritation, eye irritation, mutagencity and toxicity.

Further, among these, preferable are stearyl acrylate, lauryl acrylate, isostearyl acrylate, ethoxydiethylene glycol acrylate, isobornyl acrylate, tetraethylene glycol diacrylate, EO modified trimethylolpropane triacrylate, glycerinpropoxy triacrylate, caprolactone modified trimethylolpropane triacrylate and caprolactam modified dipentaerythritol hexaacrylate.

Further, in this invention, it is preferable to incorporate a tertiary amine compound in addition to the above-described polymerizing monomer in an ink for the purpose of restraining polymerization inhibition by oxygen to achieve higher sensitivity.

The amine compound utilized is not specifically limited provided being a compound in which the whole three hydrogen atoms of ammonia each are independently substituted by an alkyl group, a hydroxyalkyl group or an aralkyl group, and every compound well known in the art can be utilized. Specific examples thereof include such as triethylamine, tri-n-propylamine, tri-n-butylamine, dimethylethanolamine, diethylethanolamine, triethanolamine, N,N-dimethylbenzylamine, N,N-diethylbenzylamine and N,N-dimethylphenethylamine, however, are not limited thereto.

Further, for the similar purpose, a photo-polymerizing tertiary amine monomer is preferably utilized.

The photo-polymerizing tertiary amine monomer is, for example, the above-described monomer attached with a tertiary amine group, and includes amine monomers such as N-ethyl(meth)acrylamide, N-n-propyl(meth)acrylamide, N-isopropyl(meth)acrylamide, N-cyclopropyl(meth)acrylamide, N-methyl-N-ethyl(meth)acrylamide, N,N-dimethyl(meth)acrylamide, N,N-diethyl(meth)acrylamide, N,N-dimethylaminoethyl(meth)acrylamide, N,N-dimethylaminopropyl(meth)acrylamide, N-methyl-N-isopropyl(meth)acrylamide, N-methyl-N-n-propyl(meth)acrylamide, N-(meth)acryloyl morpholine, N-(meth)acryloyl pyrrolidine, N-(meth)acryloyl piperidine, N-vinyl-2-pyrolidone, N-methylenebisacrylamide, N-methoxypropyl(meth)acrylamide, N-isopropoxypropyl(meth)acrylamide, N-ethoxypropyl(meth)acrylamide, N-1-methoxymethylpropyl(meth)acrylamide, N-methoxyethoxypropyl(meth)acrylamide, N-1-methyl-2-methoxyethyl(meth)acrylamide, N-methyl-N-n-propyl(meth)acylamide and N-(1,3-dioxorane-2-yl)(meth)acrylamide, however, this invention is not limited thereto.

Further, with respect to improvement of flexibility of an ink image, monomers preferably contain propyleneoxide modified acrylate or ethyleneoxide modified acrylate, and may be either a mono-functional monomer or a bi-functional monomer. In the case of containing not less than 35 weight % of a mono-functional monomer such as an ink-jet ink of this invention, it is possible to improve curing sensitivity as well as to effectively depress odor due to such as a residual monomer by additional incorporation of said propyleneoxide modified acrylate or ethyleneoxide modified acrylate.

(Ultraviolet Ray Curable Ink Substantially Containing No Solvent)

In an ultraviolet ray curable ink of this invention, it is preferable that substantially no solvent is contained. Herein, "substantially containing no solvent" means that a content of solvent is less than 7 weight %, preferably less than 5 weight % and furthermore preferably less than 1 weight %. Further, solvents according to this invention are compounds well known in the art, and include various types of solvents described in such as Pocket Handbook of Solvent (published in 1994, edited by Society of Organic Synthetic Chemistry).

Herein, a solvent contained in an ink can be measured by an analytical method well known in the art and for example, can be measured by an analytical method such as GC (gas chromatography) and GC-MS (gas chromatography-mass spectrometry).

Further, in a solvent, which is not substantially contained in an ultraviolet ray curable ink of this invention, does not include such as a mono-functional monomer and a bi-functional monomer according to this invention.

(Photo-Polymerization Initiator)

A photo-polymerization initiator according to this invention will now be explained.

As a photo-polymerization initiator according to this invention, utilized can be benzoin alkyl ethers, such as benzoin methyl ether, benzoin ethyl ether, and benzoin propyl ether; α-diketones, such as camphor quinine, and benzyl: and acylphosphone oxide, such as 2,4,6-trimethylbenzoyl diphenylphosphine oxide, and bis(2,4,6-trimethylbenzoyl)phenylphosphine oxide.

Photo-polymerization initiators are detailed in "Applications and Market of UV-EB Curing Technology" (CMC Publishing, supervised by Yoneho Tabata/edited by Radtech Study Group), however, among them, acylphosphine oxide and acylphosphonato are specifically effective for internal curing of an ink image having a thickness of 5-12 μm per one color such as in an ink-jet method because of high sensitivity and absorption decrease due to photo-cleavage of a photo-polymerization initiator. Particularly, in an ink having a large content of a photo-polymerization initiator such as in this invention, said initiators are very effective to obtain good internal curing properties. Specifically, such as bis(2,4,6-trimethylbenzoyl)-phenylphosphine oxide and bis(2,6-dimethoxybenzoyl)-2,4,4-trimethyl-pentylphosphine oxide are preferable. Further, in selection considering safety similar to the monomers described above, preferably utilized are 1-hydroxy-cyclohexyl-phenyl-ketone, 2-methyl-1-[4-(methylthio)phenyl]-2-morpholinopropane-1-one, bis(2,6-dimethoxybenzoyl)-2,4,4-trimethyl-pentylphosphine oxide and 2-hydroxy-2-methyl-1-phenyl-propane-1-one [Dalocure (registered trademark) 1173.]. A preferable addition amount of a photo-polymerization initiator is not less than 20 weight % of a mono-functional monomer.

Herein, with respect to depressing odor increase of an ink image due to increase of the amount of a photo-polymerization initiator, the molecular weight of a photo-polymerization initiator is preferably controlled to not less than 250, and volatility of a photo-polymerization initiator becomes very low to achieve sufficient odor restraining effect, by controlling the molecular weight to not less than 250. Further, with respect to quantum efficiency of a photo-polymerization initiator, that is, with respect to curing sensitivity and solubility of a monomer, the molecular weight is preferably adjusted to more than 2,000.

In this invention, with respect to increasing adhesion-follow of an ink layer to a recording medium, irradiation of ultraviolet rays can be divided into two steps by varying wavelength or strength. Also with respect to a photo-polymerizing initiator, it is preferable to utilize at least two types having different absorption wavelengths, because the internal curing property can be enhanced.

In addition to these, in the case of coloring an ink-jet composition, it is preferable to appropriately incorporate a colorant. As a colorant, a colorant which can be dissolved or dispersed in the primary component of a polymerizing compound can be utilized; however, pigment is preferable with respect to weather proofing.

As a pigment, the following pigments, such as,

C. I. Pigment Yellow-1, 3, 12, 13, 14, 17, 42, 74, 81, 83, 87, 93, 95, 109, 120, 128, 138, 139, 150, 151, 166, 180, and 185, C. I. Pigment orange-16, 36, and 38, C. I. Pigment Red-5, 22, 38, 48:1, 48:2, 48:4, 49:1, 53:1, 57:1, 63:1, 101, 122, 144, 146, 177, and 185, C. I. Pigment Violet-19 and 23, C. I. Pigment Blue-15:1, 15:3, 15:4, 18, 27, 19, and 60, C. I. Pigment Green-7 and 36, C. I. Pigment White-6, 18 and 21, and C. I. Pigment Black-7, can be utilized, however, this invention is not limited thereto.

For dispersion of pigment, utilized can be homogenizers well known in the art, which include such as a ball mill, a sand mill, an atliter, a roll mill, an agitator, a Henschel mixer, a colloid mill, an ultrasonic homogenizer, a pearl mill, a wet type jet mill and a paint shaker. Further, at the time of dispersing pigment, a dispersant may be added and a polymer dispersant is preferably utilized. A preferable polymer dispersant includes Solsperse series by Avecia Corp. Further, as a dispersion aid, a synergist corresponding to various types of pigments may also be utilized. These dispersant and dispersion aid are preferably incorporated at 1-50 weight parts against 100 parts of a pigment.

Generally, a solvent or a polymerization compound is utilized as a dispersion medium at the time of pigment dispersion; however, it is preferable to utilize no solvent in an ink of this invention.

When a solvent is incorporated, it remains in a cured image to possibly cause problems of deterioration of solvent resistance and VOC of a residual solvent. Therefore, as a dispersion medium utilized in this invention, it is preferable to utilize no solvent but a polymerization compound and more preferable to select a monomer having the least viscosity among them, with respect to dispersion adaptability of pigment.

As for a mean particle size of pigment particles in the above-described pigment dispersion, selection of pigment, a dispersant and a dispersion medium, dispersion conditions and filtering conditions are suitably set so as to make a mean particle size of preferably 0.08-0.5 µm, and the maximum particle size of 0.3-10 µm and preferably of 0.3-3 µm. It is possible to restrain nozzle clogging of a recording head as well as to maintain storage stability, transparency and curing sensitivity of the ink by this precise particle size control. The addition amount of a colorant is preferably 1-10 weight % of the whole ink.

Further, an ink of this invention is preferably provided with a viscosity at 30° C. of 10-70 mPa·s to stabilize ejection from an ink-jet nozzle and to achieve good curing properties in excellent reproducibility.

<Image Forming Method>

Next, an image forming method of this invention will be explained.

<Ink Ejection Condition>

As an ink ejection condition, ejection is preferably conducted while a recording head and an ink are heated at 35-100° C. with respect to ejection stability. Since an ultraviolet ray curable ink exhibits a large viscosity variation width due to temperature variation and the viscosity variation itself significantly influences a liquid droplet size and a liquid droplet ejection speed resulting in deterioration of image quality, it is necessary to maintain the ink temperature constant while raising the temperature. The control range of the ink temperature is preferably a set temperature ±5° C., preferably a set temperature ±2° C. and furthermore preferably a set temperature ±1° C.

To form a high resolution image, liquid droplet quantity from each nozzle is preferably small and specifically the liquid droplet in a range of 2-15 pl is preferable; however, in the case of employing an ultraviolet ray curable ink of this invention, it is possible to further improve flexibility of cured film, sensitivity and adhesion by adjustment to the above liquid quantity.

<Light Irradiation Condition after Ink Landings>

In an image forming method of this invention, as an irradiation condition of ultraviolet rays, ultraviolet rays are irradiated preferable within 0.001-2.0 seconds after ink has landed on a recording medium and more preferably within 0.001-1.0 second; and a recording apparatus having the constitution shown in FIG. 1 which will be described later is preferably utilized.

<Total Ink Layer Thickness after Ink Landing>

In this invention, the total ink layer thickness, after ink has landed on a recording medium and has been cured by irradiation of ultraviolet rays, is preferably 2-60 µm.

Herein, "the total ink layer thickness" means the maximum value of a layer thickness of inks deposited on a recording medium, and the meaning of the total ink layer thickness is the same as in any ink-jet recording of monochrome, or of two colors accumulation (secondary color), three colors accumulation and four colors accumulation (white ink base).

In this invention, it is preferable to form images by means of an image forming method of this invention or by use of an ink-jet recording apparatus of this invention, employing a non-absorptive recording medium as a recording medium. Non-absorptive referred to herein means not to absorb an ink, and in this invention, one having ink transfer quantity, which is measured based on J. TAPPI Paper Pulp Test Method No. 51-87 or Liquid Absorption Test Method of Paper or Fiber Board (namely, Bristow's method), of less than 0.1 ml/mm$^2$ and substantially 0 ml/mm$^2$ is defined as a non-absorptive recording medium.

As a non-absorptive recording medium utilizable in this invention, various types of non-absorptive plastics and film thereof applied for so called soft packaging, in addition to such as ordinary non-coated paper and coated paper can be utilized; and various plastic film includes such as polyethylene terephthalate (PET) film, oriented polystyrene film (OPS), oriented polypropylene (OPP) film, oriented nylon (ONy) film, polyvinyl chloride (PVC) film, polyethylene (PE) film and triacetyl cellulose (TAC) film. As other plastics, polycarbonate, acrylic resin, ABS, polyacetal, PVA and rubbers can be utilized. Further, metals and glasses are also applicable.

The surface energy of these various plastic film is preferably 35-60 mN/m with respect to adhesion.

<Ink-Jet Recording Apparatus>

In the following, an ink-jet recording apparatus according to this invention will be explained appropriately referring to the drawings. Herein, a recording apparatus of the drawings is only an embodiment of an ink-jet recording apparatus of this invention and an ink-jet recording apparatus of this invention is not limited thereto.

FIG. 1 is a schematic constitution drawing to show an example of a constitution of the primary portion according an ink-jet recording apparatus of this invention.

FIG. 1 shows an example of a serial type ink-jet recording apparatus, and recording apparatus 1 is constituted of such as head carriage (light shielded) 2, recording head 3, irradiation means of ultraviolet rays 4 and platen portion 5. In this recording apparatus 1, platen portion 5 is arranged under recording medium P. Platen portion 5 has a function to absorb ultraviolet rays and absorbs excess ultraviolet rays having passed through recording medium P. As a result, a high resolution image can be reproduced very stably.

Recording medium P is guided by guide member 6 and conveyed from this side to the interior in FIG. 1 by operation of a conveying means (not shown in the drawing). A head scanning means (not shown in the drawing) conducts scanning of recording head 3 held by head carriage 2 by shifting head carriage 2 back and forth along the Y direction in FIG. 1.

Head carriage 2 is arranged over recording medium P and stores plural number of recording head 3, which will be described later, corresponding to the number of colors utilized in image printing on a recording medium, while placing the ejection outlet portion 31 downward. Head carriage 2 is arranged in a state of being freely shifted back and forth in Y direction in FIG. 1 against a recording apparatus main body, and is transferred back and forth along Y direction in FIG. 1 by drive of a head scanning means.

Herein, in FIG. 1, head carriage 2 is drawn so as to store recording head 3 of white (W), yellow (Y), magenta (M), cyan (C), black (K), light yellow (Ly), light magenta (Lm), light cyan (Lc), light black (Lk) and white (w), however, in practice, the color number of recording head 3 stored in head carriage 2 is appropriately determined. In FIG. 1, an example in which a pair of irradiation means of ultraviolet rays 4 is arranged by being fixed nearly parallel against recording medium P, however, irradiation means of ultraviolet rays may be arranged between each recording head, respectively.

Irradiation means 4 of ultraviolet rays is provided with a form nearly same as the maximum one which can be set by a recording apparatus (an ultraviolet ray curable type ink-jet printer) among regions capable of being landed on which recording head 3 ejects ultraviolet ray curable ink by one time scanning by drive of a head scanning means, or a form not smaller than a region capable of being landed.

Recording head 3 ejects ultraviolet ray curable ink supplied from an ink supply means (not shown in the drawing) toward recording medium P from ink ejection outlet 31 by operation of an ejection means (not shown in the drawing), plural number of which are arranged in the interior. Ultraviolet curable ink ejected from recording head 3 is comprised of such as a colorant, polymerizing monomer and a photo-polymerization initiator, and is provided with ability of being cured by a cross-linking and polymerization reaction accompanied with catalytic action of an initiator with irradiation of ultraviolet rays.

Recording head 3 ejects an ultraviolet curable ink as ink droplets against a predetermined region (a region capable of being landed) of recording medium P during scanning to be shifted from one end of recording medium P to the other end of recording medium P along Y direction in FIG. 1 by drive of a head scanning means, whereby ink droplets are landed on said region capable of being landed.

After the above-described scan is conducted appropriate times to eject an ultraviolet curable ink toward one of a region capable of being landed, recording medium P is appropriately shifted from this side to the interior direction in FIG. 1 by a conveying means and ultraviolet curable ink is ejected toward the next region capable of being landed adjacent to the above-described region capable of being landed along the interior direction in FIG. 1 by recording head 3 while again conducting a scan by a head scanning means.

By repeating the above-described operations to eject an ultraviolet curable ink from a recording head synchronous with a head scanning means and a conveying means, an image comprising aggregate of ultraviolet curable ink droplets is formed on a recording medium.

(Ultraviolet Ray Light-Source)

An ultraviolet ray light-source specifically includes such as a high pressure mercury lamp, a low pressure mercury lamp, a LED, a short wavelength laser light and a xenon flush lamp; among them such as a high pressure mercury lamp, a short wavelength laser light, a LED and a xenon flush lamp are preferred. Further, an emission light quantity of ultraviolet rays is preferably not less than 60 W/cm.

EXAMPLE

In the following, this invention will be specifically explained referring to examples, however, it is not limited thereto. Herein, "part" means "weight part".

Example 1

Ultraviolet ray curable ink-jet inks were prepared according to the following.

| <<Preparation of Ink-jet Ink>> <Preparation of Ink 1 (cyan)> | |
|---|---|
| (Pigment) | |
| C.I. Pigment Blue 15:3 | 4 parts |
| (Mono-functional monomer) | |
| KAYARAD R-128H | 5 parts |
| Phenoxyethyl acrylate | 20 parts |
| Isobonyl acrylate | 5 parts |
| (Bi-functional monomer) | |
| KAYARAD TPGDA | 44 parts |
| (Tri-functional monomer) | |
| Trimethylolpropane PO modified triacrylate | 13 parts |
| (Photo-polymerization initiator) | |
| Irgacure 907 | 4 parts |
| (Dispersant) | |
| Ajisper PB822 | 1 part |

A cyan ink was prepared using the above constituents.

Actually, the dispersant and the above monomers were charged into a stainless steel beaker, and dissolved while stirring and heated at 65° C. on a hot plate over 1 hour.

Successively, the resulting solution, to which the pigment was added, was poured into a polyethylene container, together with 200 g of zirconia beads having a diameter of 1 mm and sealed, followed by being subjected to a dispersion treatment for 2 hours by use of a paint shaker. Next, the zirconia beads were removed, the photo-polymerization initiator was added, and the resulting mixture was filtered through a 0.8 μm membrane filter, to prevent printer clogging, whereby, a cyan ink (C) was prepared.

This ink was designated Ink No. 1.

Ink Nos. 2-10 were prepared in a similar manner, except that some of the constituents were replaced as cited in Tables 1 and 2.

TABLE 1

| Ink No. | Mono-functional monomer | | | Bi-functional monomer | | | Tri-functional monomer |
|---|---|---|---|---|---|---|---|
| | KAYARAD R-128H | Phenoxyethyl acrylate | Isobonyl acrylate | KAYARAD TPGDA | KAYARAD NPGDA | KAYARAD HX-220 | Trimethylpropane PO modified triacrylate |
| 1 | 5 | 20 | 5 | 44 | — | — | 13 |
| 2 | 5 | 20 | 15 | 37 | — | — | 10 |
| 3 | 5 | 20 | 15 | 40 | — | — | 10 |
| 4 | 5 | 20 | 15 | 35 | — | — | 10 |
| 5 | 10 | 25 | 15 | 28 | — | — | 5 |
| 6 | 10 | 25 | 15 | 33 | — | — | 5 |
| 7 | 5 | 20 | 15 | — | 35 | — | 10 |
| 8 | 5 | 20 | 15 | — | — | 35 | 10 |
| 9 | 5 | 20 | 15 | 35 | — | — | 10 |
| 10 | 5 | 20 | 15 | 37 | — | — | 10 |

TABLE 2

| Ink No. | Initiator | | | Pigment PB15:4 | Dispersant Ajisper PB822 |
|---|---|---|---|---|---|
| | Irgacure 907 (molecular weight: 279.4) | Irgacure 369 (molecular weight: 366.5) | Irgacure 819 (molecular weight: 418.5) | | |
| 1 | 4 | — | 4 | 4 | 1 |
| 2 | 4 | — | 4 | 4 | 1 |
| 3 | 2.5 | — | 2.5 | 4 | 1 |
| 4 | 5 | — | 5 | 4 | 1 |
| 5 | 6 | — | 6 | 4 | 1 |
| 6 | 3.5 | — | 3.5 | 4 | 1 |
| 7 | 5 | — | 5 | 4 | 1 |
| 8 | 5 | — | 5 | 4 | 1 |
| 9 | — | 5 | 5 | 4 | 1 |
| 10 | Benzophenon (molecular weight: 182.2) 10 | | | 4 | 1 |

The compounds in the tables were described further below.
KAYARAD R-128H
KAYARAD TPGDA: Tripropylene glycol diacrylate
KAYARAD NPGDA: Neopentyl glycol diacrylate
KAYARAD HX-220: Caprolactone modified neopentyl glycol diacrylate
(The above KAYARADs are monomers produced by Nippon Kayaku Co., Ltd.)
Irgacure 907: molecular weight=278.4
Irgacure 369: molecular weight=366.5
Irgacure 418: molecular weight=418.5
(The above Irgacures are photo-polymerization initiators produced by Ciba Specialty Chemicals.)
PB 15:4: An abbreviation for C. I. Pigment Blue 15:4
Ajisper PBB22: A dispersant produced by Ajinomoto Fine-Techno Co., Inc.

Ink Nos. 1-10 were loaded into the apparatus shown in FIG. 1, and a printing test was conducted as follows.

Printing was performed using the recording heads shown in FIG. 1, and the apparatus was set to enable printing of a five tone image at a driving cycle of 4 kHz and four droplet continuous ejection of 4 pl droplets per cycle, and printing was done via 4-pass recording of 720 dpi X 720 dpi (herein, dpi means a dot number per inch or 2.54 cm). The ink flow path, ink chamber, and nozzles were heated with a heater to maintain the ink at 55° C.

The recording medium was a soft polyvinyl chloride sheet.

Further, after printing, the ink, ejected from the recording head onto the recording medium, was irradiated sequentially and intermittently via flash type light-source 4 (being a xenon flash lamp) based on conveyance of the carriage in the main scanning direction during printing. The carriage speed was 500 mm/s (being main scanning). In this embodiment, energy per flash onto the recording medium was 3.0 $J/cm^2$, and further the flash type light-source was driven at a frequency of 10 Hz, and emission duration of the flash (being a half value of width) was 0.8 msec, and flash emission width (namely width of light-source) was 100 mm. With the main scanning speed of the carriage described above, (flash emission width X flash cycle) was set to become 2, that is, the main scanning of flash emission width was performed via two flash cycles.

Evaluation was conducted regarding the following characteristics using the previously obtained printed samples.

<<Flexibility>>

Flexibility was evaluated for generation degree of bent flaw with 3 mmΦ at the image portions having a total ink thickness of 40 μm.

Evaluation was conducted based on the following criteria.

A: No cracking was generated when bent several times.

B: Some cracking was noted when bent several times.

C: Major cracking was noted when bent several times.

<<Adhesion>>

On the surface of the solid image portion, 25 mm wide Sellotape (a registered trademark) was firmly adhered under pressure, after which the tape was quickly peeled away at an angle of 90°, and peeling was checked.

A: No peeling of the image was noted.

B: Slight peeling of the image was noted.

C: Significant peeling of the image was noted.

<<Curability>>

A smear test was conducted using surgical cotton soaked with ethyl alcohol.

A: Almost no color loss was noted.
B: Slight color loss was noted when rubbed vigorously.
C: Significant color loss was noted when rubbed.

The results are shown in Table 3 below.

TABLE 3

| Ink No. | Flexibility | Adhesion | Curability | Within/Without of this invention |
|---|---|---|---|---|
| 1 | C | B | A | Without |
| 2 | A | A | A | Within |
| 3 | A | A | C | Without |
| 4 | A | A | A | Within |
| 5 | A | A | A | Within |
| 6 | A | B | C | Without |
| 7 | A | A | A | Within |
| 8 | A | A | A | Within |
| 9 | A | A | A | Within |
| 10 | A | A | A | Within* |

*with slight odor

Example 2

Magenta, Yellow and Black Ink were prepared in the same manner as Ink Nos. 1-10 of Example 1, except that magenta, yellow and black pigments were respectively utilized.

Herein, the pigments were:

Yellow: C.I. Pigment Yellow 150
Magenta: C.I. Pigment Red 122
Black: C.I. Pigment Black 7

Each of the color ink sets was prepared combining a cyan ink prepared in Example 1, and a magenta, yellow and black ink respectively, and images were formed the same as in Example 1, using a natural-color image chart. Then, evaluation similar to Example 1 was conducted, and similar results as for Example 1 were obtained.

What is claimed is:

1. An ultraviolet ray curable ink-jet ink comprising at least a mono-functional monomer, a propylene oxide modified acrylate or an ethylene oxide modified acrylate, a bi-functional monomer, and a photo-polymerization initiator,
    wherein an amount of the mono-functional monomer is at least 35 weight % based on the total weight of the ink-jet ink, and
    an amount of the photo-polymerization initiator is at least 20 weight % based on the total weight of the mono-functional monomer.

2. The ultraviolet ray curable ink-jet ink described in claim 1,
    wherein the ink-jet ink substantially contains no solvent.

3. The ultraviolet ray curable ink-jet ink described in claim 1,
    wherein a molecular weight of the photo-polymerization initiator is at least 250.

4. An ink-jet recording method using the ultraviolet ray curable ink-jet ink described in claim 1.

5. The ink-jet recording method described in claim 4,
    wherein image printing is conducted with a serial recording method.

6. The ink-jet recording method described in claim 4,
    wherein an ultraviolet ray light-source of at least 7.60 W/cm is employed.

7. An ink-jet recording apparatus employing an ink-jet recording method described in claim 4.

8. The ultraviolet ray curable ink jet ink described in clam 1, comprising a tertiary amine compound.

9. The ultraviolet ray curable ink-jet ink as described claim 8, further comprising a photo-polymerizing tertiary amine monomer.

10. The ultraviolet ray curable ink-jet ink described in claim 1, wherein liquid droplet quantity from each nozzle is in a range of 2-15 pl.

* * * * *